UNITED STATES PATENT OFFICE.

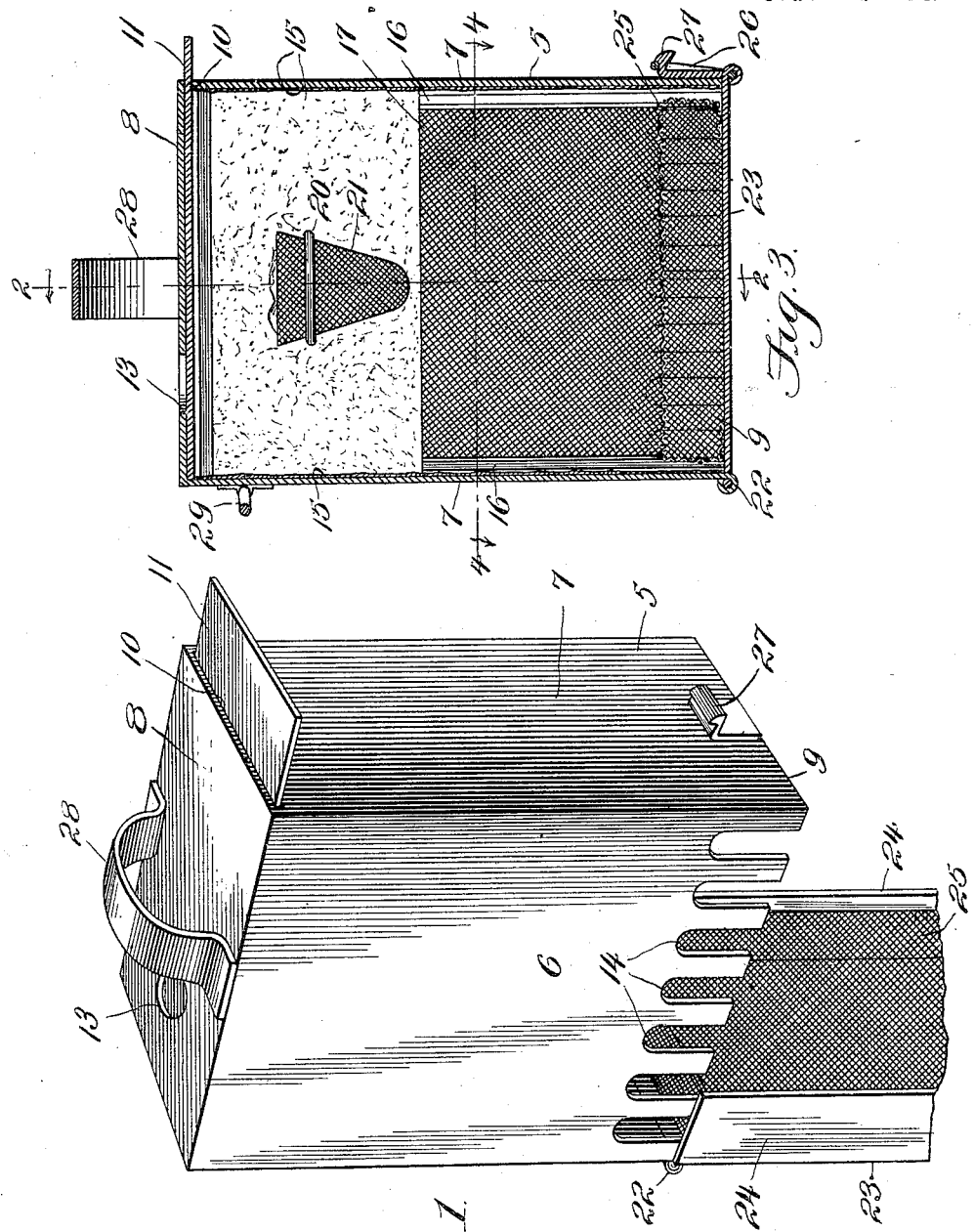

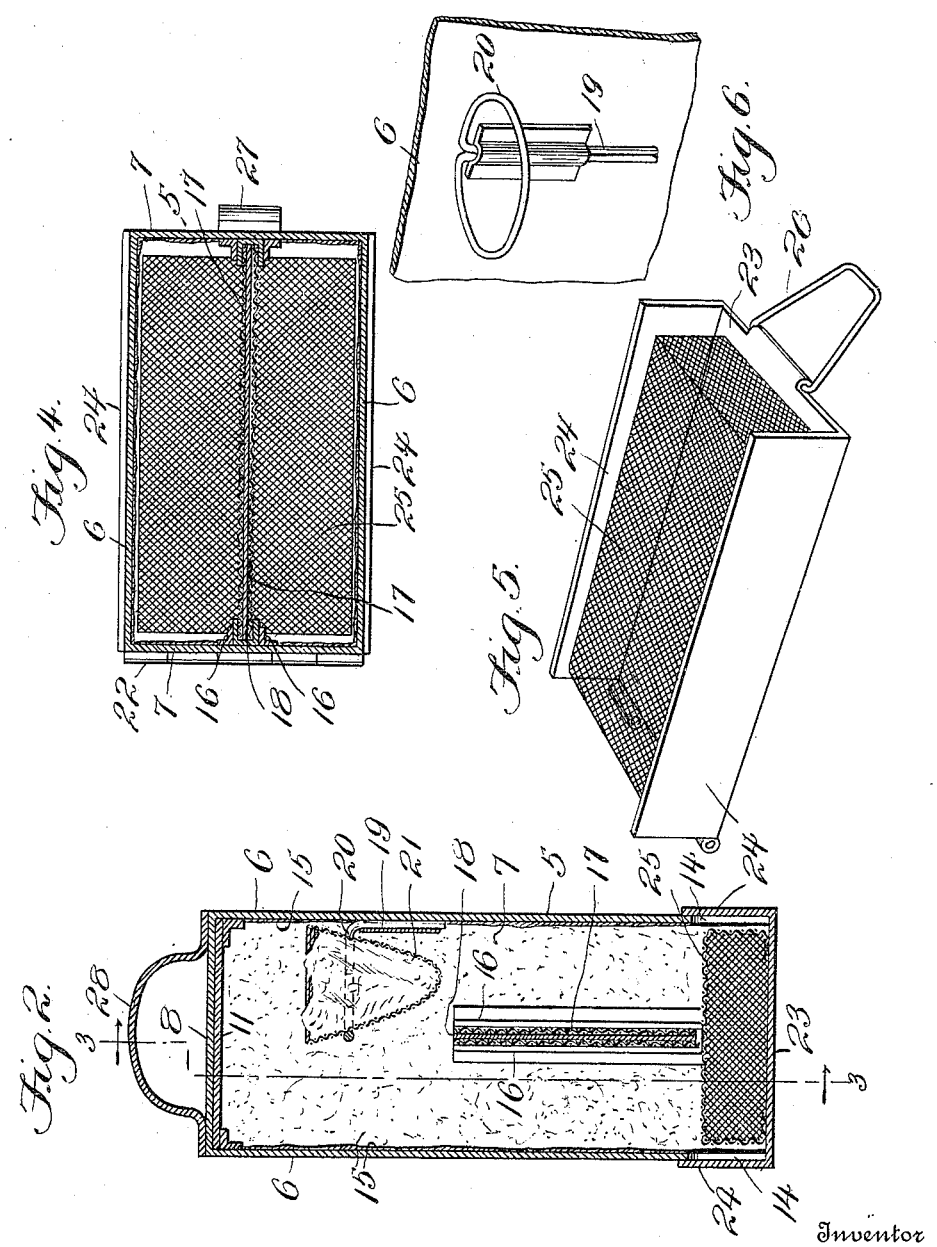

WILLIAM NEMSEY, OF BROOKLYN, NEW YORK.

INSECT-TRAP.

995,280.  Specification of Letters Patent.  Patented June 13, 1911.

Application filed January 31, 1911. Serial No. 605,705.

*To all whom it may concern:*

Be it known that I, WILLIAM NEMSEY, a citizen of the United States, residing at Brooklyn, in the county of Kings and State of New York, have invented new and useful Improvements in Insect-Traps, of which the following is a specification.

The invention relates to traps, and more particularly to the class of insect traps.

The primary object of the invention is the provision of a trap in which insects may be caught, whereby the same may be readily and conveniently destroyed, thereby freeing a house or other like place of such pests.

Another object of the invention is the provision of an insect trap in which a killing powder may be introduced thereinto for destroying or killing the insects trapped therein, the powder being sifted when passed through the trap, so that the same may be reused when desired.

A further object of the invention is the provision of a trap in which bait powder may be conveniently placed for attracting insects into the body of said trap, so that the said insects will be imprisoned, whereby the same may be killed in a ready and convenient manner for the extermination thereof.

A still further object of the invention is the provision of a trap of this character which is simple in construction, efficient in operation, thoroughly sanitary, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a perspective view of a trap constructed in accordance with the invention. Fig. 2 is a vertical longitudinal sectional view thereof. Fig. 3 is a vertical transverse sectional view. Fig. 4 is a horizontal transverse sectional view. Fig. 5 is a perspective view of the bottom removed from the trap. Fig. 6 is a fragmentary view of one wall of the trap, showing in perspective the holder for the removable food pocket.

Similar reference characters indicate corresponding parts throughout the several views of the drawings.

Referring to the drawings by numerals, the trap comprises a hollow box-like body 5, including sides 6, end walls 7, top 8, and an open bottom 9, one end wall 7 being provided at its upper edge with a slot 10 contiguous the top 8 in which is fitted an adjustable closure slide 11, the latter working in suitable guide grooves 12 provided in the inner faces of the sides 6. This closure slide 11 is adapted to normally close an orifice 13 formed in the top 8, the orifice when opened permitting the introduction of the spout of an ordinary well-known insect powder blower, whereby the killing powder contained within the blower will be introduced into the body 5 of the trap, for a purpose as will be hereinafter more fully described.

Provided in the opposite sides 6 of the body 5 is a series of elongated entrance slots 14, the same opening through the bottom or lower edges of the said sides 6, and through these slots enter the insects to be caught within the body 5 of the trap, the inner surface of the body being coated with any desirable roach food or paste 15 which will attract the insects interiorly of the body of the trap.

Secured to the inner faces of the end walls 7 of the body 5 are spaced vertical guide cleats 16, between which is engaged a bait frame 17, the same being preferably constructed from wire mesh, and is provided with a central food sheet 18 which also serves to attract the insects within the body of the trap. This frame 17 extends only substantially one-half of the height of the body of the trap, so that the insects may fall over the frame to either side thereof.

Suitably fixed to one side wall, medially thereof, within the body 5 is a bracket 19 having a loop or eye 20 into which is removably fitted a food container or pocket 21, in which is placed suitable baiting food for the insects, after the same have entered the body of the trap.

Secured to the lower edge of one end wall 7 of the body 5 are hinges 22, the same being also connected to a swinging bottom closure 23, the latter being adapted to close the open bottom 9 of the body 5 of the trap. This bottom closure 23 is formed with upturned flanges 24 at opposite longitudinal edges thereof, and to which is suitably secured a screen or sieve 25, which is spaced from the bottom closure 23 the required degree, so that the insect killing powder introduced into the body 5 of the trap will be caught by the sieve 25 which will sift the powder onto the bottom closure 23, whence it may be removed therefrom for reuse. Of course, it is to be understood that the instant the powder is blown into the body 5 of the trap, it will affect the insects imprisoned therein causing instant death of the same, whereupon the deadened insects will fall upon the sieve 25 and on the opening of the bottom closure 23, they may be dropped into any suitable receiver for destroying the same in any desirable manner.

Suitably connected to the free end of the bottom closure 22 is a hinged catch 26, the latter being adapted for engagement with the keeper 27 secured exteriorly to the contiguous end wall 7 of the body 5 of the trap, the catch when engaged with the keeper will sustain the bottom closure in position for closing the open bottom of the trap.

Connected in any desirable manner to the top 8 of the body 5 of the trap is a handle 28 which enables the trap to be transported from one point to another or for the placing of the same on the table or lifting it therefrom. Mounted in one end wall is a perforated ear or loop 29 which enables the trap to be hung upon a nail driven in the wall of a room. It is evident that if it is desired, the bottom closure 23 may hang in open position, so that insects may enter the open bottom 9 in the body 5 of the trap, the insects being attracted by the food substance therein, as hereinbefore described.

The bottom closure may be mounted upon the body 5 in any suitable manner other than by the use of hinges, if so desired.

What is claimed is:

An insect trap comprising a body having a perforation in its top and an open bottom, a coating of food material on the inner face of the body, a closure hinged to the bottom of the body, means for locking the closure in closed position, and a screen carried by said closure, the said body being provided with spaced entrance slots in opposite sides thereof and opening through the lower edges of the same.

In testimony whereof I affix my signature in presence of two witnesses.

WILLIAM NEMSEY.

Witnesses:
JACOB ZEIGER,
LOUIS SCHWARTZ.

---

Copies of this patent may be obtained for five cents each, by addressing the "Commissioner of Patents, Washington, D. C."